United States Patent [19]

Hubbard

[11] Patent Number: 4,558,091

[45] Date of Patent: Dec. 10, 1985

[54] METHOD FOR PREPARING ALUMINUM AND POLYHYDRIC ALCOHOL MODIFIED LIQUID ABSORBING COMPOSITION

[75] Inventor: Edward D. Hubbard, West Liberty, Iowa

[73] Assignee: Grain Processing Corporation, Muscatine, Iowa

[21] Appl. No.: 638,382

[22] Filed: Aug. 7, 1984

Related U.S. Application Data

[63] Continuation of Ser. No. 494,118, May 13, 1983, abandoned.

[51] Int. Cl.$^4$ ............... C08L 3/02; C08L 3/04
[52] U.S. Cl. ................... 524/734; 525/54.31
[58] Field of Search ............ 527/300, 312, 313; 525/329.9, 54.31; 252/431 R; 424/65, 66; 524/734

[56] References Cited

U.S. PATENT DOCUMENTS

| | | | |
|---|---|---|---|
| 4,043,952 | 8/1977 | Ganslaw et al. | 527/300 |
| 4,282,121 | 8/1981 | Goodrich | 527/312 |
| 4,302,369 | 11/1981 | Elmquist | 527/312 |
| 4,412,036 | 10/1983 | Pedersen et al. | 525/54.26 |

Primary Examiner—John Kight
Assistant Examiner—Nathan M. Nutter
Attorney, Agent, or Firm—Neuman, Williams, Anderson & Olson

[57] ABSTRACT

Modification of a starch hydrolyzed polyacrylonitrile graft copolymer with aluminum or with aluminum and a polyhydric alcohol.

7 Claims, No Drawings

METHOD FOR PREPARING ALUMINUM AND POLYHYDRIC ALCOHOL MODIFIED LIQUID ABSORBING COMPOSITION

This is a continuation of Ser. No. 494,118 filed May 13, 1983, now abandoned.

This invention relates to compositions which absorb large quantities of liquid and the preparation thereof.

Saponified or hydrolyzed starch-polyacrylonitrile graft copolymers are known to exhibit the capacity to absorb large quantities of liquid per unit weight thereof. Because of this property, such compositions have found use in various products such as diapers, paper towelling, bandages, surgical pads, catamenial devices, bed pads and so forth.

Graft copolymers of starch-polyacrylonitrile per se are known as well as are methods for their preparation. Thus, it is known that acrylonitrile can be grafted onto starch using ceric salts or other initiators to form starch-polyacrylonitrile graft copolymers. See, for example, U.S. Pat. No. 2,922,768. Such graft copolymers can also be prepared by the reaction of acrylonitrile with pre-irradiated starch which is prepared by irradiation of starch with gamma rays or an electron beam. See Reyes, Clark, Comas, Russell and Rist, Nuclear Applications, 6, 509–517 (1969). In such graft copolymers the starch serves as a backbone or building block onto which the acrylonitrile is grafted and therefore the starch need be present in only very small proportions with respect to the polyacrylonitrile moiety. For the purpose of this invention, the starch-polyacrylonitrile graft copolymer starting materials can be prepared by any of the known methods; neither the ratio of acrylonitrile to starch nor the method of initiation are critical.

Saponification or hydrolysis of starch-polyacrylonitrile graft copolymers with aqueous solutions of base such as potassium hydroxide is also known. For example, U.S. Pat. No. 3,425,971 is directed to certain such saponified materials. Also, U.S. Pat. No. 3,661,815 describes the preparation of saponified or hydrolyzed starch-polyacrylonitrile and hydrolyzed starch-polymethacrylonitrile graft copolymers wherein the hydrolysis is carried out using an aqueous alcohol solution of a base. The method disclosed in this latter patent constitutes a preferred method for producing the hydrolyzed starch-polyacrylonitrile or polymethacrylonitrile graft copolymers used in this invention. The disclosure of U.S. Pat. No. 3,661,815 is incorporated herein by reference. The designation HS-PAN is used throughout this application to embrace saponified or hydrolyzed starch-polyacrylonitrile and starch-polymethacrylonitrile graft copolymers.

Recent advances in the art of preparing liquid absorbing compositions involves reacting HS-PAN copolymers with various reactants to improve the products for use in various applications to absorb water, such as water absorbent laminated products. Thus, U.S. Pat. No. 4,302,369 relates to aluminum modified HS-PAN graft copolymers and the preparation thereof. According to this patent, the disclosures of which are included herein, HS-PAN copolymers are modified by reacting therewith an aluminum source, such as aluminum chloride, such that from about 5% to about 95% by weight of the free carboxyl groups present are neutralized with aluminum.

Similarly, improved compositions are obtained by reacting HS-PAN with a polyhydric alcohol. The copending patent application of Lee C. Pedersen and Lyle F. Elmquist, Ser. No. 290,385, now U.S. Pat. No. 4,412,036, relates to the preparation of such improved compositions. In accordance with that application, a liquid polyhydric alcohol is combined by mixing at ambient temperatures with Henkel's SGP 147, which is a powdered, aluminum-treated HS-PAN copolymer, such that the resulting product contains about 3% to 20% by weight of the polyhydric alcohol. The polyhydric alcohols which are combined with the HS-PAN copolymers are defined by the formula $$HOCH_2(CHOH)_nCH_2OH$$

where n is 1–5. Representative of such alcohols are glycerol, erythritol, xylitol, sorbitol, mannitol and dulcitol, with glycerol being the most preferred.

Modification of the HS-PAN copolymers with aluminum and a polyhydric alcohol improves bonding capabilities, fluid absorbency characteristics and desired wicking properties when the compositions are used between backing sheets in liquid absorbing laminated products. For many applications, improved fluid absorbency characteristics can be obtained by treatment of HS-PAN copolymers with aluminum without treatment with a polyhydric alcohol.

Hydrolyzed graft copolymers modified by treatment with aluminum and a polyhydric alcohol can be prepared by a procedure involving:

(1) preparing the aluminum salt of the aqueous saponified HS-PAN graft copolymer subsequent to hydrolysis but before drying to a solid containing about 10% water, (2) treating the dried, aluminum-treated HS-PAN with a polyhydric alcohol, and (3) heating said mixture to about 150° F. (66° C.) for 30–60 minutes and then cooling to produce a dry, free-flowing powder.

The above procedure is less than satisfactory when treating HS-PAN copolymers which have been saponified or hydrolyzed using an aqueous alcohol solution of a base as described in U.S. Pat. No. 3,661,815. Thus, when an aluminum source or compound is added to the aqueous methanol saponified HS-PAN graft copolymer slurry as indicated, a large percentage of the aluminum is lost, presumably during washing or during the solid/liquid separation process prior to drying. When a polyhydric alcohol, such as glycerol, is added to the dry, aluminum modified HS-PAN, the resultant product becomes tacky and cohesive to the extent that the product readily cakes and will not flow properly, unless the mixture is first heated for a considerable period, such as at least 30 minutes. Also, the addition of an aqueous solution of a polyhydric alcohol to the dry HS-PAN or aluminum-treated HS-PAN results in the formation of the gelled product which has little value as an absorbent.

It is a major object of this invention to provide liquid absorbing HS-PAN graft copolymers modified by treatment with aluminum and a polyhydric alcohol.

It is another object of the invention to provide methods for preparing HS-PAN graft copolymers modified by treatment with aluminum and a polyhydric alcohol.

A further object of the invention is to provide methods for preparing HS-PAN graft copolymers modified by treatment with aluminum.

This invention provides improved methods for preparing liquid absorbing compositions of HS-PAN graft copolymers modified by treatment with aluminum or aluminum and a polyhydric alcohol. The improved liquid absorbing compositions are prepared by a simplified procedure which can be carried out at ambient temperature and which avoids excessive loss of aluminum. In contrast to prior art practices, this invention describes the addition of an aqueous aluminum solution or an aqueous aluminum-polyhydric alcohol solution to the dry HS-PAN graft copolymer, resulting in the formation of a dry, non-tacky, free-flowing powder without resorting to a subsequent heating step.

According to this invention, a dry HS-PAN graft copolymer is treated with aluminum or a combination of aluminum and a polyhydric alcohol. The source of aluminum can be aluminum hydroxide or a salt of aluminum such as aluminum chloride, aluminum acetate, basic aluminum acetate and mixtures of the foregoing and the like. The polyhydric alcohols which are combined with the HS-PAN copolymers are alcohols having the formula

HOCH$_2$(CHOH)$_n$CH$_2$OH where n is 1–5. Representative of such alcohols are glycerol, erythritol, xylitol, sorbitol, mannitol and dulcitol, with glycerol being the most preferred.

The amount of aluminum ion added to the HS-PAN graft copolymer should be 0.05 to 2%, preferably 0.1 to 1%, based on the weight of the treated HS-PAN copolymer. Similarly, if a polyhydric alcohol is employed, use levels should be sufficient to provide about 2 to 15%, preferably 4 to 10%, of the final composition.

Modification of the HS-PAN copolymer by simultaneous treatment with aluminum and a polyhydric alcohol can be easily accomplished by mixing a source of aluminum with the polyhydric alcohol and contacting the polymer with the mixture. Similarly, modification of the HS-PAN copolymer can be easily accomplished by contacting the copolymer with a source of aluminum. It is generally preferable to employ an aqueous solution of an aluminum compound or an aqueous solution of an aluminum compound and polyhydric alcohol which can be metered onto the dry polymer accompanied by good agitation. The aluminum or the aluminum-polyhydric alcohol mixture in the form of an aqueous solution can be conveniently sprayed on the agitated, dry polymer. When water is used as the carrier, it is generally employed in such amounts that the final composition contains from 0.2% to 30% and preferably 1% to 20% water by weight.

The treatment of the hydrolyzed graft copolymer with aluminum or the aluminum-polyhydric alcohol mixture can be accomplished at ambient temperature or at elevated temperature on the order of 20° to 95° C. Use of an ambient temperature is preferred.

The advantages of the invention will be further apparent from the following examples and test data.

EXAMPLE 1

A known amount of dry HS-PAN graft copolymer was placed into a container and then treated with 15.4% (by weight) of a mixture containing 35.2% aluminum chloride hexahydrate and 64.7% glycerol (by weight). The contents were mixed by shaking on a paint shaker for 10 minutes. At the end of this time, the product was relatively dry and free-flowing.

The product was then heated in a water bath at 80° C. with stirring for 30 minutes. The resultant product was a non-tacky powder which showed no signs of caking and had good flow characteristics.

An absorbent laminate was prepared using the product. The laminate was prepared by distributing the modified HS-PAN copolymer on a 6×6 inch paper tissue and covering the absorbent with a second paper tissue. The laminate was then pressed between two sheets of aluminum foil at a pressure of 2000 psig and at a temperature of 240° F. (116° C.), for 30 seconds. When tested for liquid absorbing capacity, samples of the laminate absorbed (took-up) 97 grams of distilled water and 32 grams of an aqueous, 1% sodium chloride solution (w/v) per gram of treated HS-PAN graft copolymer added to the laminate.

EXAMPLE 2

A known quantity of dry HS-PAN graft copolymer was weighed into a 25 gallon kettle and slowly agitated. An aqueous solution containing 53.1% glycerol and 15.9% aluminum chloride (by weight) was then sprayed onto the agitated polymer. The add on amounted to 10% glycerol, 3% aluminum chloride and 6.1% water by weight on the untreated as is HS-PAN. After mixing for 30 minutes the mixture, relatively dry and free-flowing at this point, was heated to and held at 150° F. (66° C.) for 30 minutes before cooling. The resultant absorbent product was not tacky, did not cake and was free-flowing. The product contained 7.5% glycerol and 0.45% aluminum on a dry basis and 4.7% volatiles.

An absorbent laminate was prepared by separating a two-ply paper tissue into separate plies; one of the separated plies was wrapped around a heated metal roll and the absorbent polymer was metered onto the preheated tissue. The two paper plies were then recombined while maintaining contact with the heated drum. The two recombined plies were passed between a heated roll and a second hard rubber roll and finally the laminate was cooled. When tested for liquid absorbing capacity, samples of the so-prepared laminate absorbed (took up) 33.1 grams of a 1% sodium chloride solution (w/v) per gram of treated HS-PAN graft copolymer added to the laminate.

EXAMPLE 3

A weighed quantity of dry HS-PAN graft copolymer was placed into a ribbon blender and gently agitated. An aqueous solution containing 45.5% glycerol and 9.1% aluminum chloride (by weight) was sprayed onto the agitated absorbent. The add on amounted to 15% glycerol, 15% water and 3% aluminum chloride, by weight, on the untreated, as is HS-PAN. The mixture was stirred for 30 minutes before screening and bagging. The analysis of the resultant product showed 7.8% glycerol and 0.32% aluminum on a dry basis and 12.8% volatiles. The product was dry, non-tacky, non-caking and free-flowing.

The product was used to prepare an absorbent laminate as described in Example 2. Examination of the laminate showed a strong bond held both tissues together with little evidence of loss or sifting of the absorbent from the laminate. When tested for liquid absorbing capacity, samples of the laminate absorbed (took up) 33 grams of an aqueous 1% sodium chloride solution (w/v) per gram of the treated HS-PAN graft copolymer added to the laminate.

EXAMPLE 4

A known amount of dry HS-PAN graft copolymer was placed in a plastic jar. An aqueous 56.8% glycerol (wt/wt) solution was then added (10% glycerol by weight of polymer) and the jar tightly capped and the mixture shaken for 20 minutes on a paint shaker.

The resultant product contained numerous large chunks of gelled material and was totally unsuitable for laminate production.

EXAMPLE 5

A known quantity of dry HS-PAN graft copolymer was placed in a Hobart mixer bowl and gently agitated. An aqueous 34% aluminum chloride solution (wt/wt) was then sprayed onto the agitated absorbent and mixed for 30 minutes to insure uniformity. Results, summarized in the following Table, show substantially all of the aluminum chloride added was retained in contrast to prior procedures which result in substantial losses.

Wet out times decreased sharply with increasing aluminum chloride usage.

| Sample No. | Aluminum Chloride | | Wet Out Times (seconds) |
|---|---|---|---|
| | % added to as is HS-PAN | % Recovered in Product | |
| 1 | 0 | 0 | 210 |
| 2 | 1 | ca · 100 | 130 |
| 3 | 2 | 77 | 77 |
| 4 | 3 | 94 | 24 |
| 5 | 4 | 96 | 9 |

The method of preparing treated HS-PAN copolymers according to this invention offers a major advantage of simplicity and economy. By the method of the invention HS-PAN copolymers can be modified by treating the same simultaneously with water and aluminum or with aluminum and a polyhydric alcohol. With this process there is no loss of aluminum in contrast to previous procedures for treating graft copolymers with aluminum. In addition, the simultaneous incorporation of aluminum and glycerol into dry HS-PAN results in the formation of a dry, free-flowing powder in contrast to prior art procedures. The modified polymers prepared in accordance with the invention possess good liquid absorbing capabilities and can be readily and inexpensively prepared. The modified polymers are useful in a wide variety of applications and can be used to form absorbent laminate products.

Those modifications and equivalents which fall within the spirit of the invention are to be considered a part thereof.

What is claimed is:

1. A method for modifying a hydrolyzed starchpolyacrylonitrile or methacrylonitrile graft copolymer which comprises treating said copolymer in dry state with an aqueous source of aluminum ions.

2. A method in accordance with claim 1 wherein the copolymer is treated with aluminum at ambient temperature.

3. A method in accordance with claim 1 wherein the copolymer is treated with aluminum at an elevated temperature.

4. A method for modifying a hydrolyzed starch polyacrylonitrile or methacrylonitrile graft copolymer which comprises treating said compolymer in dry state with a mixture of a polyhydric alcohol and a source of aluminum ions.

5. A method in accordance with claim 4 wherein an aqueous mixture of a polyhydric alcohol and a source of aluminum ions is employed.

6. A method in accordance with claim 4 wherein the copolymer is treated with said mixture at ambient temperature.

7. A method in accordance with claim 4 wherein the copolymer is treated with said mixture at an elevated temperature.

* * * * *